US010549577B2

(12) United States Patent
Supron et al.

(10) Patent No.: US 10,549,577 B2
(45) Date of Patent: Feb. 4, 2020

(54) WHEEL ASSEMBLY, METHODS, AND APPLICATIONS

(71) Applicant: Maidbot, Inc., Austin, TX (US)

(72) Inventors: Steve Supron, Ithaca, NY (US); Steven Whitehead, Austin, TX (US); David Moroniti, Austin, TX (US); Micah Green, Austin, TX (US)

(73) Assignee: Maidbot, Inc., Austin, TX (US)

( * ) Notice: Subject to any disclaimer, the term of this patent is extended or adjusted under 35 U.S.C. 154(b) by 156 days.

(21) Appl. No.: 15/799,369

(22) Filed: Oct. 31, 2017

(65) Prior Publication Data

US 2018/0117962 A1 May 3, 2018

Related U.S. Application Data

(60) Provisional application No. 62/414,912, filed on Oct. 31, 2016.

(51) Int. Cl.
| | | |
|---|---|---|
| *B60B 27/02* | (2006.01) | |
| *F16B 3/00* | (2006.01) | |
| *F16B 17/00* | (2006.01) | |
| *F16B 21/18* | (2006.01) | |
| *B60B 27/06* | (2006.01) | |
| *B60B 7/06* | (2006.01) | |
| *B60B 7/10* | (2006.01) | |
| *B60B 19/12* | (2006.01) | |
| *B60C 17/04* | (2006.01) | |

(Continued)

(52) U.S. Cl.
CPC ............ *B60B 27/026* (2013.01); *B60B 7/066* (2013.01); *B60B 7/105* (2013.01); *B60B 19/12* (2013.01); *B60B 27/065* (2013.01); *B60C 17/041* (2013.01); *F16B 3/00* (2013.01); *F16B 17/00* (2013.01); *F16B 21/186* (2013.01); *B60B 19/003* (2013.01); *B62D 5/02* (2013.01)

(58) Field of Classification Search
CPC ....... B60B 27/026; B60B 7/066; B60B 19/12; B60B 27/065; B60C 17/041
USPC ...................................... 391/37.102
See application file for complete search history.

(56) References Cited

U.S. PATENT DOCUMENTS

| 4,230,211 A | 10/1980 | Goto et al. | |
|---|---|---|---|
| 6,179,387 B1 * | 1/2001 | Nasset, Sr. ............. | B05B 12/30 301/37.102 |

(Continued)

FOREIGN PATENT DOCUMENTS

WO     2013032530     3/2013

OTHER PUBLICATIONS

International Search Report and Written Opinion for PCT Application PCT/US2017/059347 dated Feb. 26, 2018; Form PCT/ISA/210 and PCT/ISA/237; 11 pages.

*Primary Examiner* — S. Joseph Morano
*Assistant Examiner* — Jean W Charleston
(74) *Attorney, Agent, or Firm* — Fenwick & West LLP

(57) ABSTRACT

A quick release mechanism for a wheel includes a hub and a clip, which interact with a wheel or roller that may or may not be part of the invention per se. The hub is disposable on a drive shaft such that it will rotate with the drive shaft. An optional hub cap is disposable on the wheel and has an opening that is complimentary to the geometry of the hub to allow engagement thereof such that the hub the hub cap rotate together. The clip is disposable on the hub in a closed or an open position so that the hub cap cannot or can be removed from the hub.

10 Claims, 5 Drawing Sheets

(51) Int. Cl.
*B60B 19/00* (2006.01)
*B62D 5/02* (2006.01)

(56) References Cited

U.S. PATENT DOCUMENTS

| | | | | |
|---|---|---|---|---|
| 6,349,994 B1 * | 2/2002 | Chapman | ............ | B60B 33/0002 |
| | | | | 301/111.01 |
| 6,692,085 B1 * | 2/2004 | Threadgill | ............ | B60B 7/0073 |
| | | | | 301/37.103 |
| 6,932,434 B2 * | 8/2005 | Wang | ........................ | B60B 7/12 |
| | | | | 301/37.102 |
| 2010/0187779 A1 * | 7/2010 | Potter | .................... | B60B 19/003 |
| | | | | 280/5.514 |
| 2012/0031212 A1 | 2/2012 | Forrest | | |

\* cited by examiner

WHEEL ASSEMBLY, METHODS, AND APPLICATIONS

RELATED APPLICATION DATA

The instant application claims priority from U.S. Provisional application Ser. No. 62/414,912 filed Oct. 31, 2016, the subject matter of which is incorporated by reference herein in its entirety.

GOVERNMENT FUNDING

N/A.

BACKGROUND

Aspects and embodiments of the invention are most generally directed to a wheel assembly and associated methods and applications; more particularly to a quick release mechanism for a wheel; and, most particularly to a quick release mechanism for a wheel used on a movable robotic platform, and associated methods and applications.

Although not intended to be limiting in any way or manner, aspects and embodiments of the invention disclosed herein will be described in terms of a quick release mechanism for a wheel used on a robotic vacuum (or floor) cleaner.

The wheels of a commercial vacuum cleaner are prone to getting dirty and/or clogged with debris during use. Wheel service, cleaning, and/or replacement may typically be conducted during a professional service call, generating expense and taking up potential in-use time. It would be beneficial and advantageous to be able to easily remove, clean, replace, and/or otherwise service the wheel(s) of a commercial vacuum cleaner without the need for professional services, specialized tools, and in a more cost- and time-efficient manner. These advantages are enabled by the embodied invention.

SUMMARY

An aspect of the invention is a quick release wheel mechanism. An embodied quick release wheel mechanisms include a hub and a clip, which interact with a wheel or roller that may or may not be part of the invention per se. According to an embodiment, a quick release wheel mechanism includes a hub component that is disposable on a drive shaft such that it will rotate with the drive shaft, wherein the hub component has a given geometry and includes clip component engagement means; and a clip component having hub component engagement means that are engageable with the clip component engagement means, wherein the clip component is disposable in at least one of a closed position so as to preclude the engagement or disengagement of a wheel from the hub and an open position so as to allow the engagement or disengagement of the wheel from the hub, through the hub cap opening. In various alternative embodiments, the quick release wheel mechanism may include one or more of the following limitations, features, components, characteristics, steps as follows:

wherein the clip component engagement means are diametrically opposed openings and the hub component engagement means are diametrically opposed projections engageable in the openings;

wherein the clip component engagement means are diametrically opposed projections and the hub component engagement means are diametrically opposed openings engageable in the projections;

further comprising a hub cap component disposable on the wheel, wherein the hub cap component has an opening that is complimentary to the geometry of the hub component to allow engagement thereof such that upon engagement of the hub cap component with the hub component the hub cap component will rotate with the hub component;

wherein the hub cap component further comprises a depression in an outer surface thereof configured to receive a fingertip of a person;

wherein the hub cap component further comprises a clip detent that engages the clip component in the closed position;

wherein the hub geometry and the hub cap opening are longitudinally elongate in shape and the clip component has a semi-circular geometry;

further comprising a wheel engageable with the hub component and upon which the hub cap is disposable;

wherein the wheel is an omni-wheel.

DETAILED DESCRIPTION OF EXEMPLARY, NON-LIMITING EMBODIMENTS OF THE INVENTION

Figure 1:
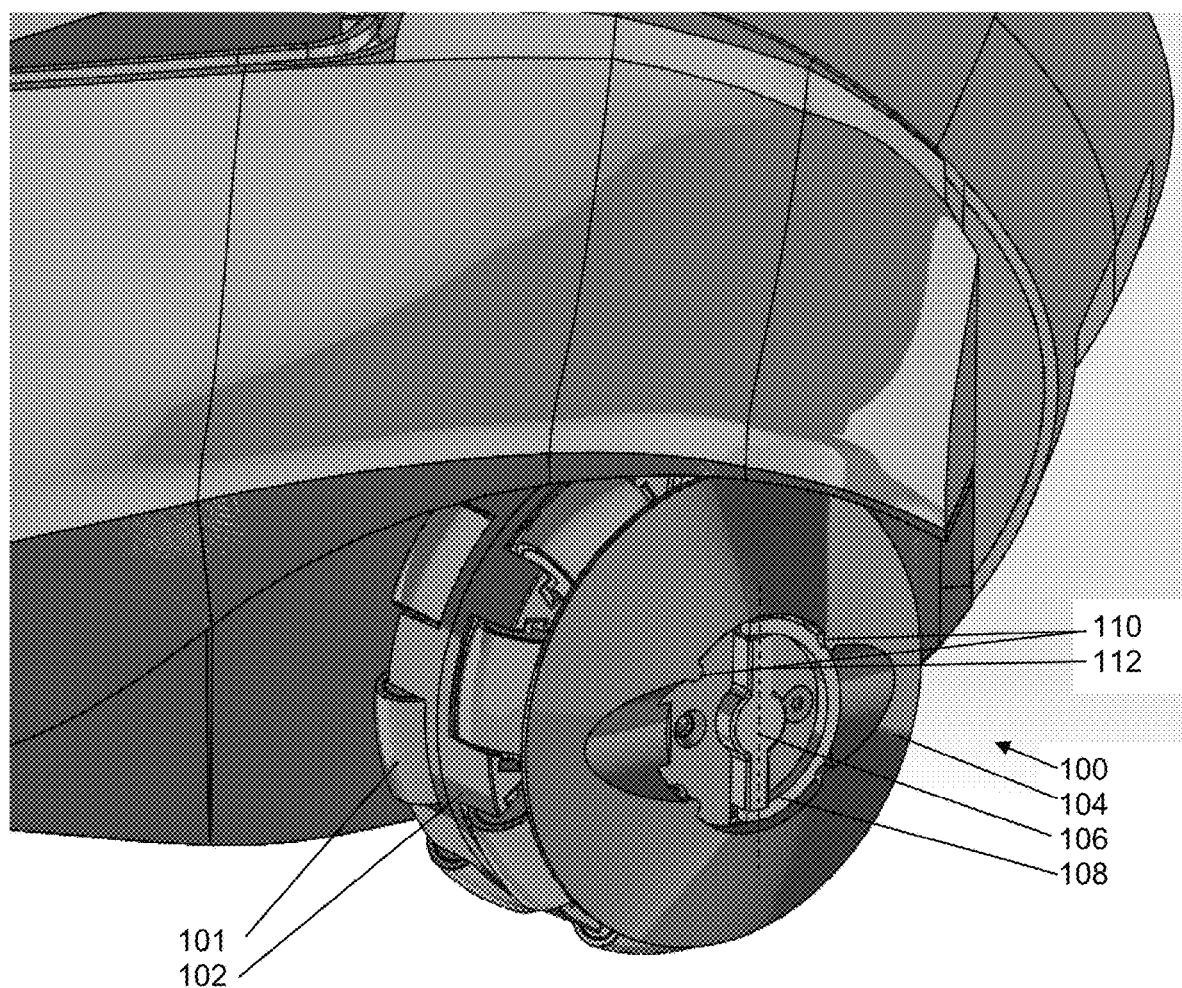
FIG. 1 schematically illustrates an assembled quick release wheel mechanism including a direct-driven Mecanum or Omni-wheel (not part of the invention per se) mounted on a robotic vacuum cleaner platform, according to an illustrative embodiment of the invention.

FIG. 1 illustrates a robotic vacuum cleaner omni-wheel assembly 100 showing a direct-drive Mecanum or Omni/poly wheel 102 with rollers 101 (not part of the invention per se), and a quick release wheel mechanism including a hub cap component 104 (which may or may not be a part of the invention per se; see FIG. 3) attached to an outer surface of the wheel assembly, a hub component 106 that is directly mounted to the wheel's drive motor (not part of the invention per se; see FIG. 3), and a semi-circular clip component 108 that is pivotally attached to opposite transverse ends of the hub. It will be appreciated that the wheel per se may be of any type provided that it can be mounted onto the drive shaft/hub assembly. The clip is advantageously made of an elastic or resilient-type material that can sufficiently flex to be assembled to the hub. The clip 108 is shown in FIG. 1 rotated to a 'closed' position to secure the wheel to the driving hub 106. The clip is made of a material (e.g., plastic, metal) such that it can flex enough to forcibly pass one or more small detents 110 formed in the hub cap 104 to secure/lock the wheel in the installed position when it is oriented transverse to the hub cap slot 116. The clip 108 can be rotated to an 'open' position (see FIG. 5) thus orienting it parallel to the longitudinal axis 112 of the hub and the slot 116.

Figure 2:
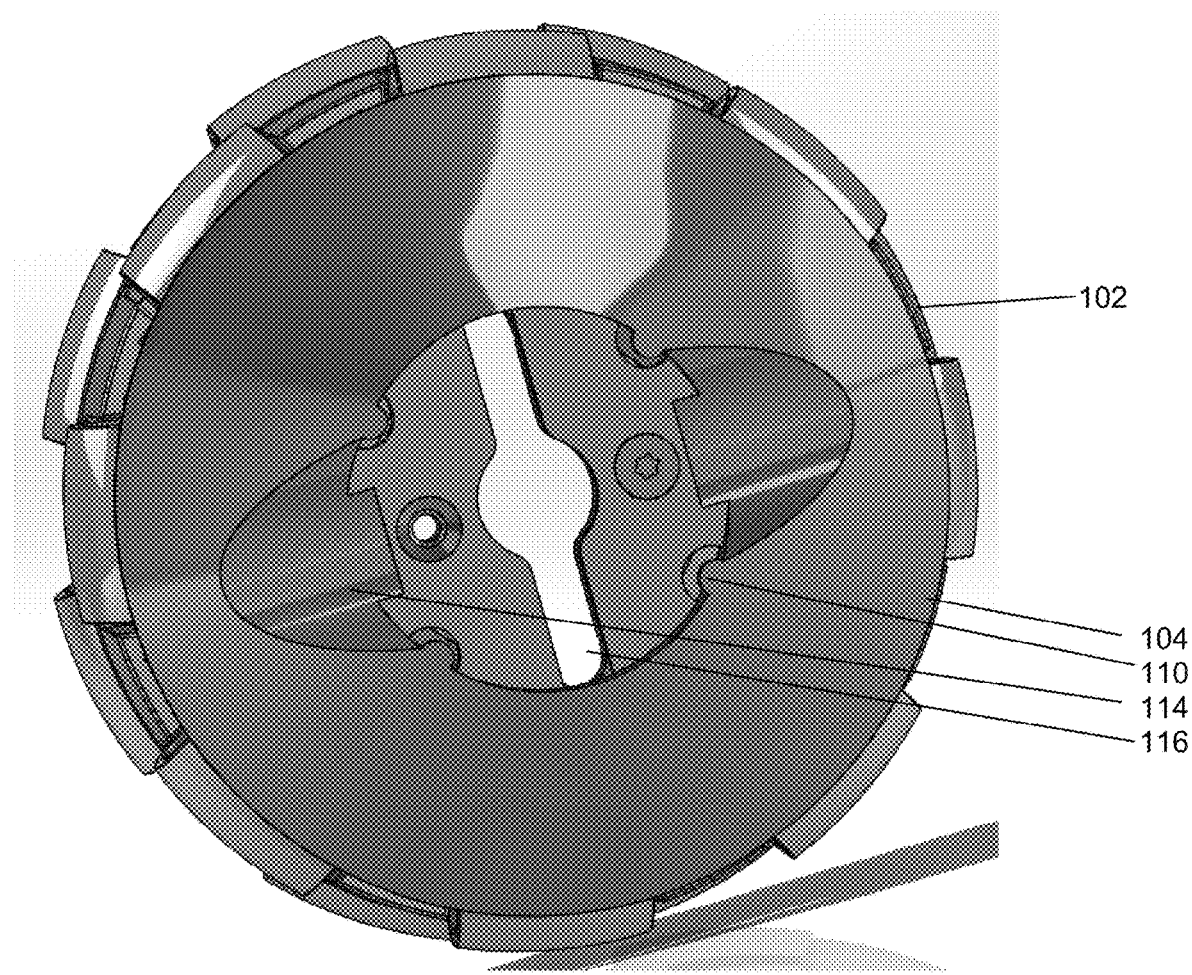
FIG. 2 schematically shows a hub cap component and features thereof of the quick release wheel mechanism, according to an illustrative embodiment of the invention.

FIG. 2 shows the hub cap 104 including the clip detent(s) 110, scalloped finger access regions 114, and a shaped slot 116 that is complimentary to the shape of the end of the hub 106 for engagement therewith. The shaped slot 116 enables the wheel 102 to be engaged and driven by the hub 106. It will be appreciated that the shape of the hub and the opening in the hub cap need only be complimentary so as to allow engagement and rotation of the hub cap with the hub. The scalloped cuts 114 in the hub cap allow finger access to the clip 108 edges.

Figure 3:
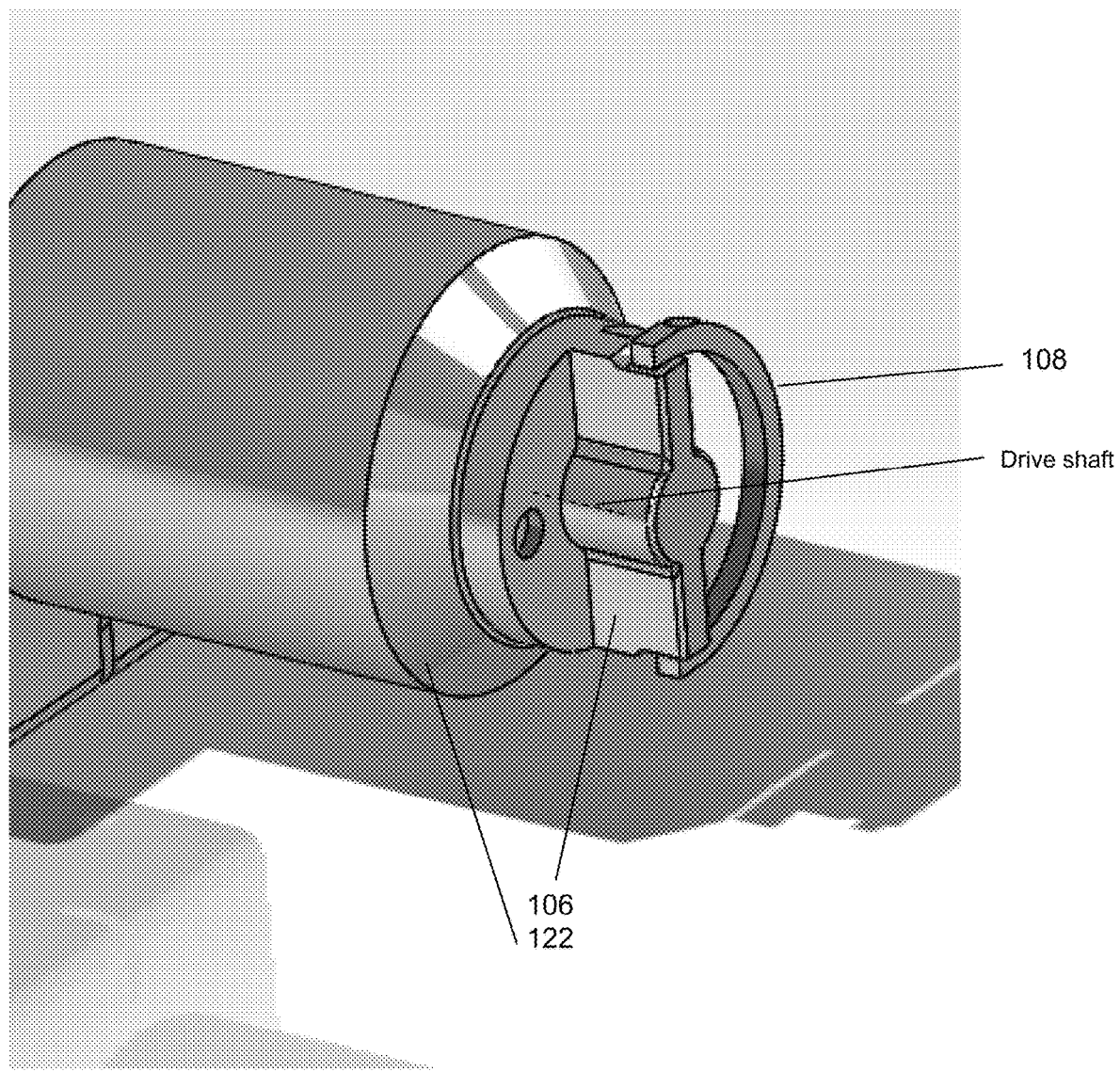
FIG. 3 schematically illustrates a motor pod (not part of the invention per se) that contains a motor (not shown, not part of the invention per se) therein with a hub component of the quick release wheel mechanism that is press-fit to the motor drive shaft and spins with the drive shaft, according to an illustrative embodiment of the invention.

FIG. 3 illustrates a wheel-drive motor pod 122 (not part of the invention per se) that contains a motor (not shown, not part of the invention per se) therein. The hub 106 may advantageously be press-fit to the motor drive shaft (shown in dotted line), thus spinning with the motor shaft when it turns. Clip 108 is also shown being oriented in the 'closed' position.

Figure 4A:
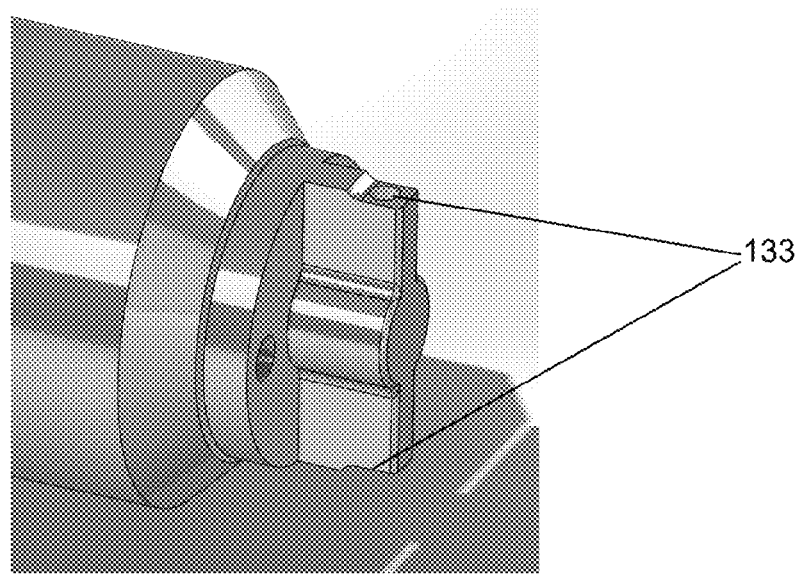
FIG. 4A schematically illustrates the motor pod with the hub component installed.
Figure 4B:
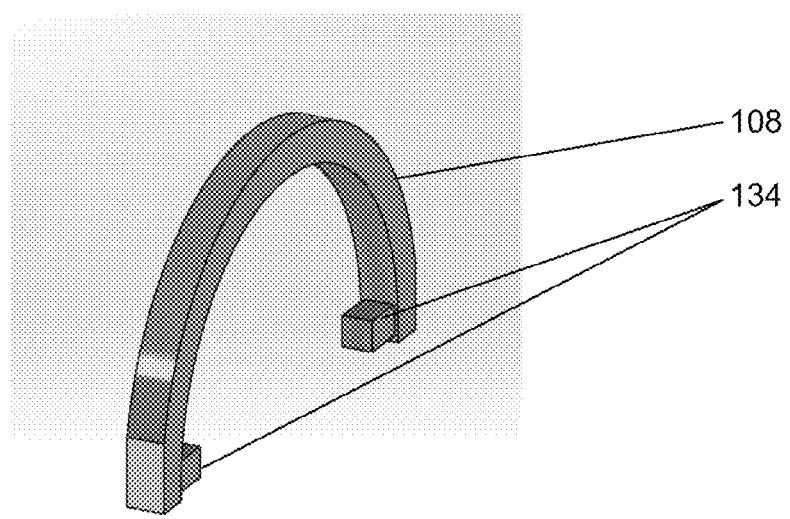
FIG. 4B schematically illustrates a snap clip component of the quick release wheel mechanism, according to an illustrative embodiment of the invention.
Figure 5:
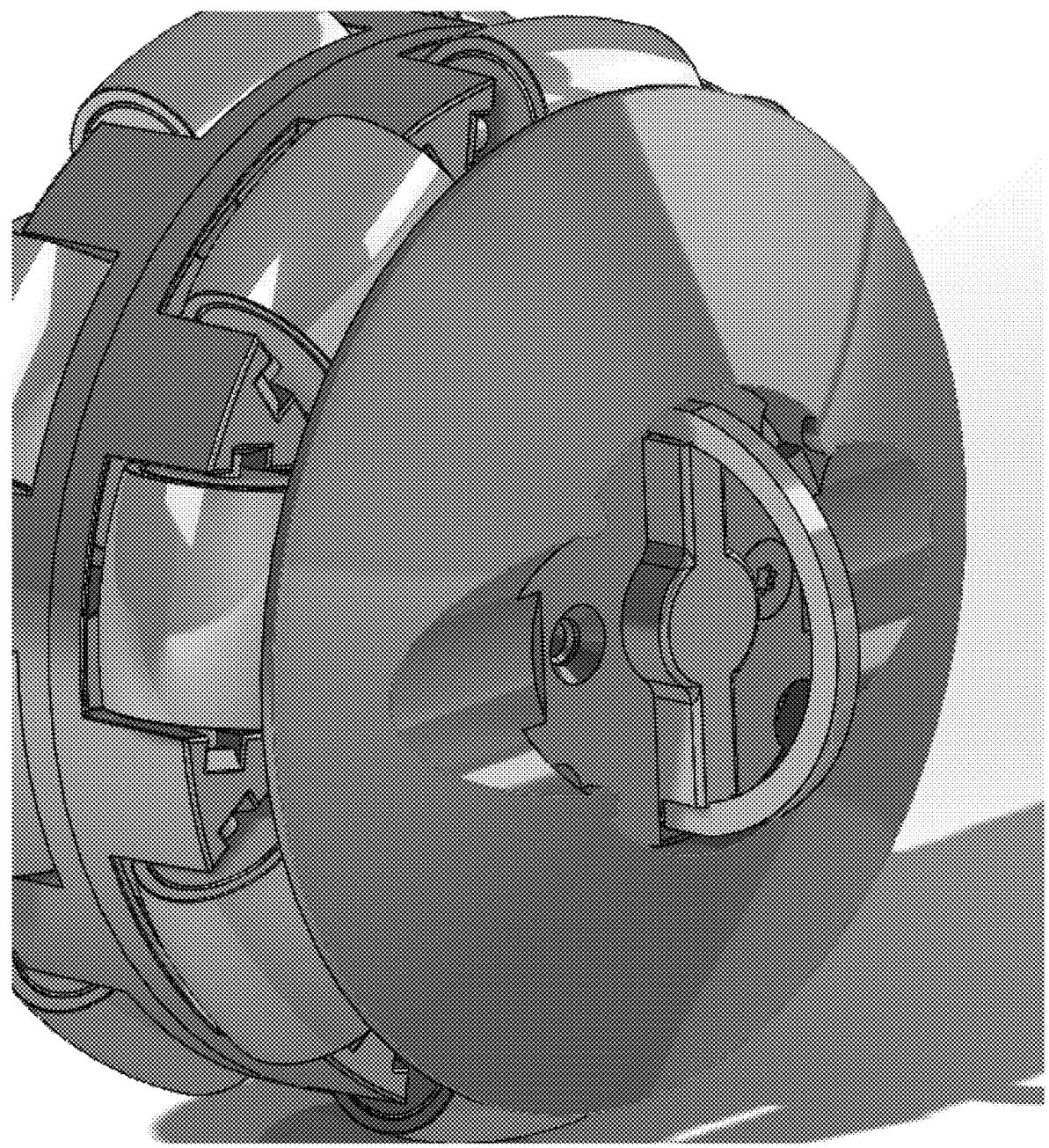
FIG. 5 schematically shows the snap clip component of the quick release wheel mechanism in an 'open' orientation, according to an illustrative embodiment of the invention.

FIG. 4A illustrates the motor pod 122 with the hub installed as shown in FIG. 3 but without the clip 108. FIG. 4B illustrates the snap clip 108, which is configured to flex in order to mount to the opposite ends 133 of the hub 106 via projections 134 that are rotatably disposed in openings in hub ends 133. Similarly although not shown, the ends of the clip could have openings that could engage complimentary projections on the opposite ends of the hub. The detents 110 (FIG. 2) on the hub cap enable the clip to have two operational orientations: 'closed' as shown in FIG. 1 and 'open' as shown in FIG. 5. In the open position, the clip 108 is parallel to or aligned with the shaped slot 116 in the hub cap and the longitudinal axis 106 of the end of the hub, enabling removal of the hub cap/wheel assembly.

In operation, a person may engage the tips of their thumb and a finger in scallops 114, flip the clip 108 from the secured 'closed' position to the 'open' position, and simply and easily slide the wheel off the hub 106. Reinstallation of the wheel is performed by the reverse procedure.

Another embodiment of the invention is a quick release wheel assembly as illustrated in FIG. 3, in which a hub cap 104 is optional but not required. While the hub cap provides certain convenience features for operation such as access spaces for a person's fingertips and detents to locking/unlocking the clip in the 'closed' and 'open' positions, a wheel such as wheel 102 shown in FIG. 1, without the hub cap 104, may be slid over hub 106, and clip 108 moved to a 'closed' position similarly as described above. The wheel itself may have detent features to secure the clip in the 'closed' position, or the engagement features 133 on the hub and 134 on the clip may be so shaped to provide secure positioning in the open and closed positions and ease of movement between those positions.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A quick release wheel mechanism, comprising:
   a hub component configured to couple to a drive shaft such that the hub component will rotate with the drive shaft, the hub component comprising a central portion aligned with the drive shaft and two hub projections projecting outward from the central portion in opposite directions, each hub projection comprising an opening comprising clip component engagement means and configured to receive a hub component engagement means, the hub projections configured to align with a reciprocal slot of a hub cap and to drive rotation of the hub cap when the drive shaft rotates while the hub cap is coupled to the hub component; and
   a clip component having hub component engagement means that are engageable with the clip component engagement means, wherein the clip component can be configured in each of a closed position so as to preclude the engagement or disengagement of a wheel from the hub component and an open position so as to allow the engagement or disengagement of the wheel from the hub component.

2. The quick release wheel mechanism of claim 1, wherein each hub projection opening comprises an opening within a surface of a corresponding hub projection facing away from the central portion.

3. The quick release wheel mechanism of claim 1, wherein each hub component engagement means comprises a hub component projection projecting inward towards a center of the clip component, and wherein the hub component projections are aligned.

4. The quick release wheel mechanism of claim 1, further comprising a hub cap configured to couple to the hub component via the reciprocal slot of the hub cap.

5. The quick release wheel mechanism of claim 4, wherein the hub cap further comprises a depression in an outer surface of the hub cap adjacent to clip component when the clip component is configured in the closed position, the depression enabling a fingertip of a person to reconfigure the clip component to the open position.

6. The quick release wheel mechanism of claim 4, wherein the hub cap further comprises a clip detent that enables the clip component, when configured in the closed position, to abut a surface of hub cap.

7. The quick release wheel mechanism of claim 4, wherein the hub component, when coupled to the hub cap, protrudes through the reciprocal slot of the hub cap such that the openings within the hub projections are accessible for coupling the clip component to the hub component.

8. The quick release wheel mechanism of claim 4, further comprising a wheel coupled to the hub cap.

9. The quick release wheel mechanism of claim 8, wherein the wheel is an omni-wheel.

10. The quick release wheel mechanism of claim 1, wherein a width of the central portion of the hub component is greater than a width of either hub projection.

\* \* \* \* \*